United States Patent
Yamamoto

[15] 3,693,746
[45] Sept. 26, 1972

[54] AUTOMOTIVE SUSPENSION MECHANISM

[72] Inventor: Akira Yamamoto, No. 1024 Shimanagatami-cho, Minami-ku, Yokohama, Japan

[22] Filed: Nov. 5, 1969

[21] Appl. No.: 874,319

[30] Foreign Application Priority Data

Nov. 14, 1968    Japan .....................43/82866

[52] U.S. Cl. ...........................180/73 TL, 280/124 B
[51] Int. Cl. ..............................................B60g 11/36
[58] Field of Search .........180/73, 73 TL, 73 TS, 71; 280/124.3

[56] References Cited

UNITED STATES PATENTS

| | | |
|---|---|---|
| 3,002,580 | 10/1961 | Mueller et al. ..............180/73 |
| 3,419,100 | 12/1968 | Enke ...........................180/73 |
| 3,428,142 | 2/1969 | Kraus et al...................180/73 |

*Primary Examiner*—A. Harry Levy
*Attorney*—Robert E. Burns and Emmanuel J. Lobato

[57] ABSTRACT

A rear suspension mechanism of motor vehicles having a pair of trailing arms and a pair of axle drive shafts with inner and outer universal joints, each of the trailing arms being made up of an inner and outer leaves connected with each other through a connecting member connected to the wheel hub and the axle drive shaft being of the type that no positively sliding mechanism is involved. The suspension mechanism permits the driving wheels to assume proper camber and steer angles and to move in the fore-and-aft direction of the vehicle.

14 Claims, 8 Drawing Figures

AUTOMOTIVE SUSPENSION MECHANISM

The present invention relates, in general, to a motor vehicle and, in particular, to a rear suspension mechanism of a motor vehicle.

The invention is directed specifically to a rear suspension mechanism of the type using trailing arms and axle drive shafts with two, inner and outer, universal joints each.

The rear suspension mechanism of this specific type can be classified into two major categories depending upon how the trailing arms are positioned with respect to the chassis frame of the vehicle.

In one type of such rear suspension mechanism, as heretofore been devised and practised, the trailing arms are so positioned that the axis of rotation of each trailing arm with respect to the chassis frame intersects the center of the inner universal joint of each axle drive shaft. The trailing arms being positioned in this manner, it is difficult to have available desired camber and steer angles of the driving wheels especially when the wheels are raised or lowered while the vehicle is running. This sometimes leads to the jacking-up of the vehicle when the vehicle is making a turn and, as a result, the driving wheels tend to slip on the road surface.

The other type of the rear suspension mechanism of the specified type is devised with a view to avoiding such a difficulty, in which the axis of rotation of each trailing arm deviates from the center of the inner universal joint of each drive shaft. A sliding mechanism is included in the axle drive shaft in order to provide a variation in the distance between the inner and outer universal joints of each drive shaft to permit the driving wheel to be raised or lowered. Such provision of a sliding mechanism not only is reflected by the complicated construction arrangement of the suspension system but creates a friction between the sliding parts. This type of the rear suspension is thus considered unacceptable for practical purposes because of the problems in the production cost and reliability.

This invention therefore contemplates provision of a new and improved rear suspension mechanism which is drastically cleared of the difficulties experienced in the prior art construction of the rear suspension mechanism previously defined.

It is an important object of this invention to provide a rear suspension mechanism having a simplified construction and yet offering reliable performance, the suspension thus being easy and economical to manufacture.

It is another important object of the invention to provide a rear suspension mechanism using substantially no positively sliding parts.

It is still another important object of the invention to provide a rear suspension mechanism adapted to make available, when the driving wheels are to be raised or lowered, desired camber and steer angles of the driving wheels completely independently of the axle drive shafts and without involving any sliding mechanism used in the drive shafts.

In order to accomplish these important objects of this invention, it is herein proposed to use three independent members as a trailing arm. These members are, different from the usual trailing arm, capable of being warped substantially laterally of the vehicle body, permitting the driving wheel to assume proper camber and steer angles and to move in the fore-and-aft direction of the vehicle most desiredly. Thus, the driving wheel is afforded with reasonable compliance in the direction of its axle shaft without use of any sliding mechanism in the drive shaft connected with the axle. The driving wheel being connected to the axle drive shaft through the outer universal joint of the latter, the camber and steer angles of the driving wheels are in no way dictated by the drive shafts. These camber and steer angles of the driving wheels being raised or lowered can be determined as desired depending upon the axis of pivotal movement of the trailing arms with respect to the chassis frames of the vehicle body.

Other features and advantages of the rear suspension mechanism according to the present invention will become more apparent from the following description of the invention taken in conjunction with the accompanying drawings in which like reference numerals are assigned to like parts in all the figures and in which.

Now, a preferred embodiment of the rear suspension mechanism according to the invention is to be described with reference to FIGS. 1 to 4.

Figure 1:
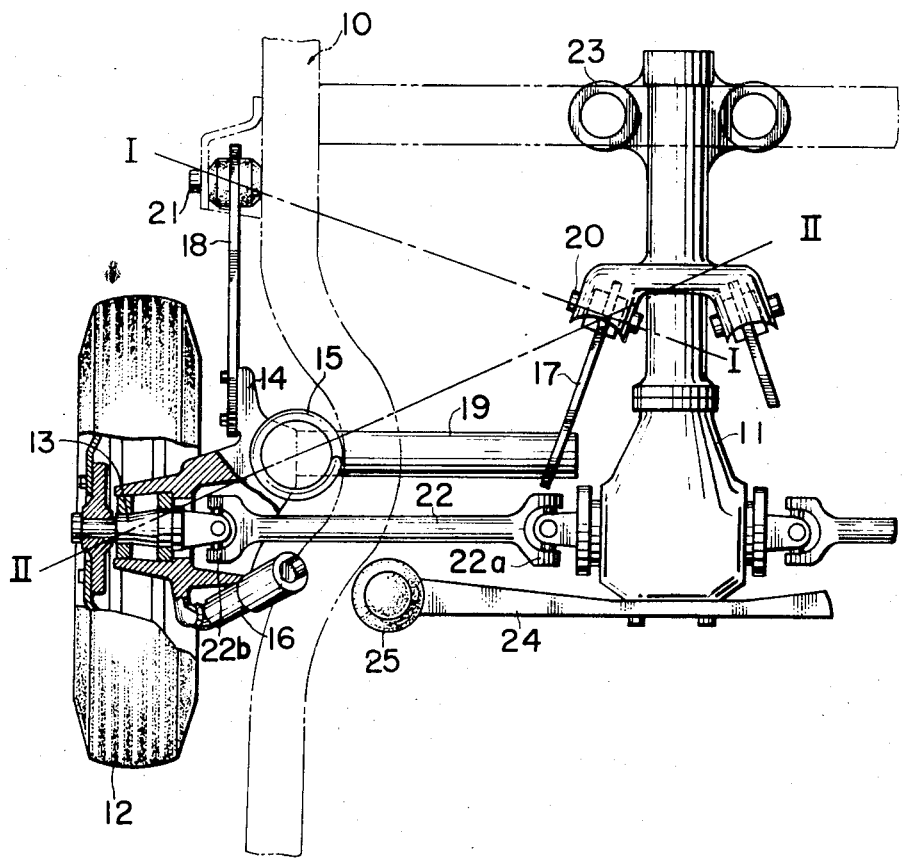
FIG. 1 is a plan view of the rear suspension mechanism according to the invention.
Figure 2:
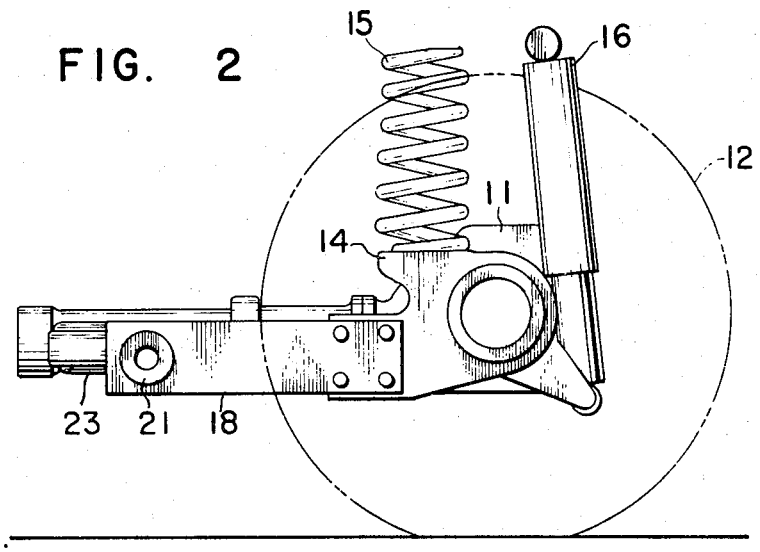
FIG. 2 is a side elevation of the suspension mechanism shown in FIG. 1.
Figure 3:
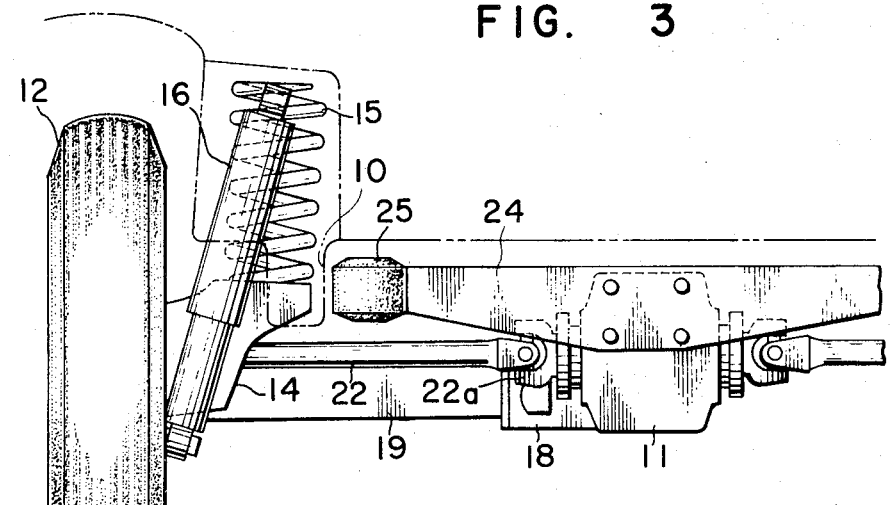
FIG. 3 is a rear end view of the rear suspension mechanism shown in FIGS. 1 and 2.

As best seen in FIG. 1, the rear suspension mechanism is mounted on a chassis frame 10 which may include any structural member of the chassis of the vehicle body. The frame 10 carries thereon a final drive unit 11 which is connected to the propeller shaft (not shown) to transfer a driving power from the power train (not shown) to the driving wheels one of which is indicated by 12. The wheel 12 is rotatably carried by the chassis frame 10 by means of a spindle 13 fixedly secured to the wheel and rotatably journaled to a wheel hub 14. The wheel hub 14 is carried by the chassis frame 10 through a coil spring 15 and a shock absorber 16 mounted between the frame and wheel hub.

Figure 4:
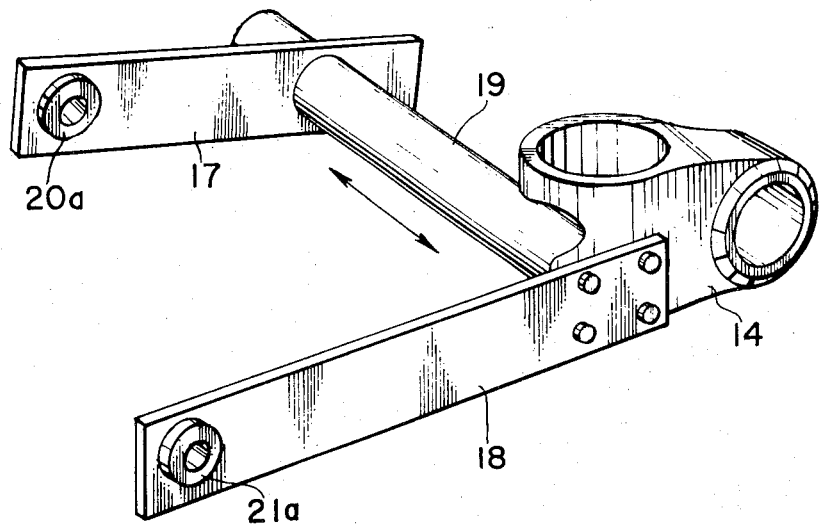
FIG. 4 is a perspective view showing the essential parts of the rear suspension mechanism shown in the preceding figures.

The trailing arm is, according to the invention, constituted essentially by three elementary members, inner and outer leaves 17 and 18, respectively, and a third member 19 connecting the leaves with each other at their rear end portions. The connecting member 19 is rigidly connected at one end to the wheel hub 14 and at the other to the rear end portion of the inner leaf 17. The inner and outer leaves 17 and 18, respectively, are directed approximately in the direction of advance, viz., in the forward direction, of the vehicle. As best seen in FIG. 4, the two leaves 17 and 18 are positioned normal to the horizontal plane, viz., to a plane parallel to the plane of the vehicle floor (not shown). The inner leaf 17 is connected at its end portion remote from the connecting member 19 to the housing of the final drive unit 11 through a pin joint 20 rotatably in the vertical plane 2, the axis of the pin joint 20. The outer leaf, on the other hand, is connected at its rear end portion rigidly to the wheel hub 14 and at the other end portion to the chassis frame 10 through a pin joint 21 also rotatably in the vertical plane about the axis of the pin joint 21.

The final drive unit 11 is operatively connected with a pair of axle drive shafts one of which is indicated by 22, as shown. The axle drive shaft 22 has at its both ends inner and outer universal joints 22a and 22b, respectively, and is therethrough operatively connected with the final drive unit 11 and spindle 13.

The final drive unit 11 is shown in FIG. 1 as being connected at the front to the frame 10 through a resilient member 23 and at the rear to an auxiliary frame or sub-frame 24 which, in turn, is connected to the frame 10 through a resilient member 25.

The rear suspension mechanism according to the invention being thus constructed and arranged, the inner and outer leaves 17 and 18, respectively, are allowed to rotate, complete with the connecting member 19 and wheel hub 14, about a line I—I substantially connecting the center points of the pin joints 20 and 21. If preferred, the pin joints 20 and 21 may include rubber bushing. The driving wheel 12 is thus allowed to move up or down as the leaves 17 and 18 are tilted upwardly or downwardly, respectively, about the line I—I. This axis I—I of rotation of the leaves 17 and 18, which axis is included in a substantially horizontal plane, is angled with respect to the transverse direction of the vehicle body but it is not so largely angled as to pass through the center of the inner universal joint 22a of the drive shaft 22. The angle of the line I—I with respect to the lateral direction of the vehicle body dictates the camber and steer angles of the driving wheel 12.

The leaves 17 and 18 being more elastic in the direction normal to the faces thereof than in the other directions, they are liable to elastic deformation in this particular direction so that the wheel hub 14 and connecting member 19 have an allowance for displacement in the direction of the connecting member, viz., in the direction of the arrow in FIG. 4. Since, however, the leaves 17 and 18 are sufficiently rigid in their lengthwise and widthwise directions, the leaves withstand a force and moment exercised to change the camber and steer angles and relative position of the wheels in the fore-and-aft direction of the vehicle. The wheels can be thus rigid to the chassis frame as is the case in which a usual trailing arm is used.

Since, moreover, no sliding mechanism is used in the drive shaft 22, the distance between the inner and outer universal joints 20 and 21, respectively, can be kept unchanged at all times. As a result, the wheel 12 is constrained from moving with respect to the chassis frame 10 in the lateral direction of the vehicle body. The twisting torque carried from the final drive unit 11 is transferred to the driving wheel 12. The rigidity of the wheel 12 in the direction of the axle shaft can be still increased by increasing the rigidity in the mechanical connection between the final drive unit 11 and chassis frame 10.

Where a rubber bushing is used for the pin joint 21 of the outer leaf 18, the wheel 12 can be provided with adequate compliance in the fore-and-aft direction of the vehicle entirely independently of the rigidity in the lateral direction of the vehicle body, provided the performance characteristics of the rubber bushing is suitably determined. This will prove advantageous to isolate the road noise from the chassis frame 10.

The force which the coil spring 15 exercises on the pin joint 21 of the outer leaf 18 may be significantly reduced if, as illustrated in FIG. 1, the coil spring 15 is located substantially on line II—II connecting the center points of the driving wheel 12 and pin joint 20 of the inner leaf 17. This will add to the compliance of the driving wheel 12 in the fore-and-aft direction of the vehicle and thus makes it easier to design the pin joint 21 on a practical basis.

Figure 5:
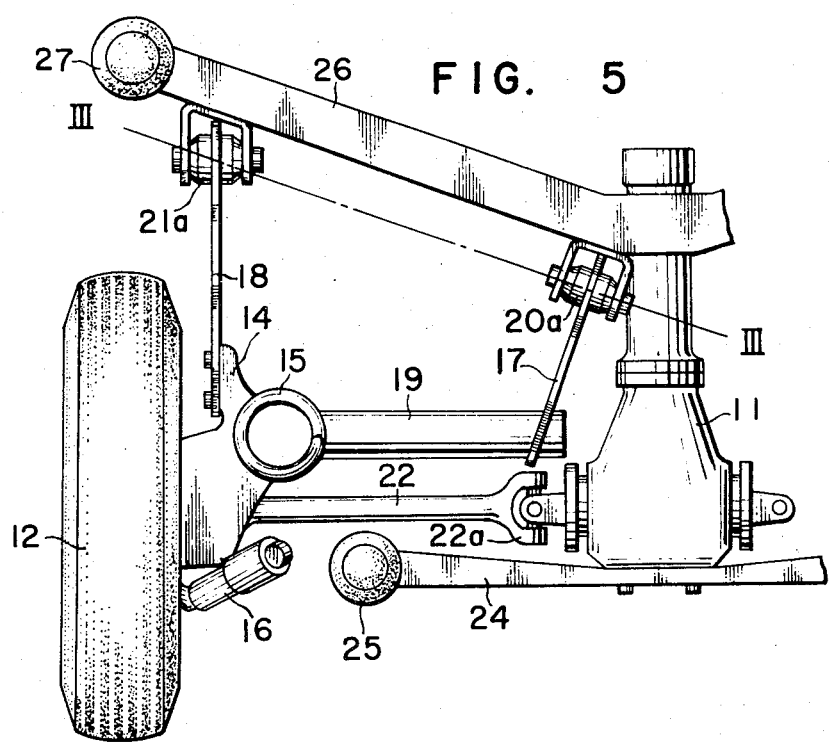
FIG. 5 is similar to FIG. 1 but shows a modification of the rear suspension mechanism of FIG. 1.
Figure 6A:
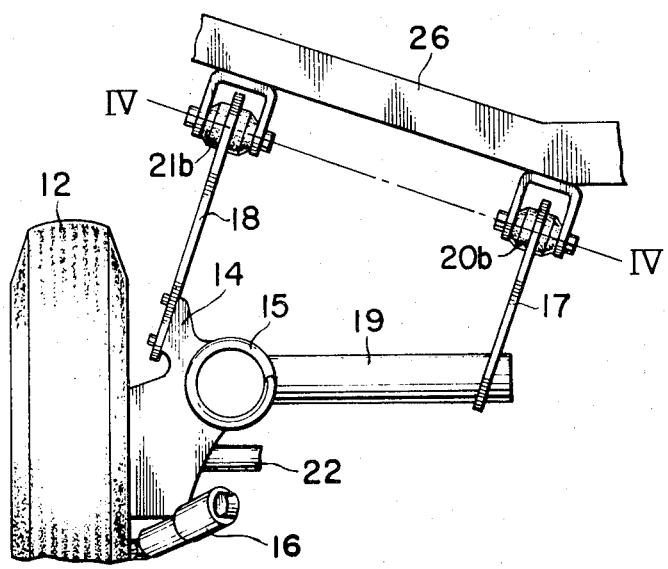
FIGS. 6a and 6b are fragmentary plan views showing further modified embodiments of the modification of FIG. 5.
Figure 6B:
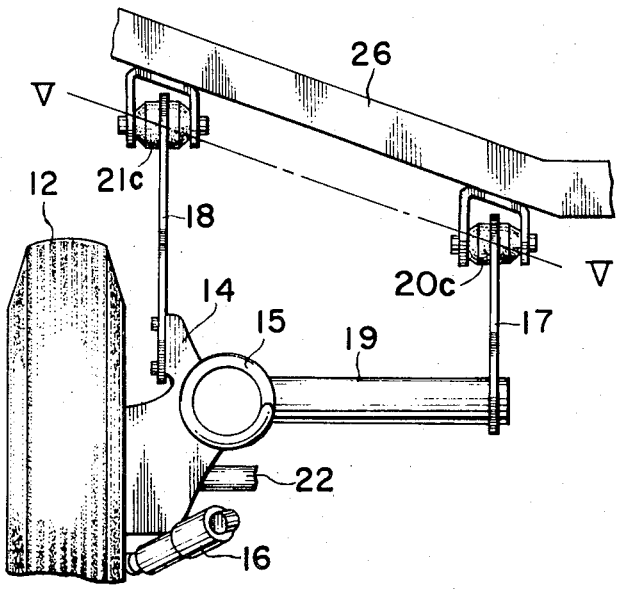

The inner leaf 17 constituting the trailing arm in the suspension mechanism according to the invention has been described and shown in FIGS. 1 to 4 as mounted on the final drive unit 11, the same may be mounted otherwise, examples being shown in FIGS. 5 and 6a and 6b.

In FIG. 5, the inner and outer leaves 17 and 18, respectively, are mounted at their front ends on an auxiliary frame or sub-frame 26 through pin joints 20a and 21a, respectively. The sub-frame 26 is herein shown, by way of example, as positioned in a direction substantially parallel to a line III—III connecting the center points of the pin joints 20a and 21a, viz., in a direction at an angle to the lateral direction of the vehicle body. The sub-frame 26 is mounted at its outer end portion on the chassis frame through a resilient member 27 and at its inner end portion carries the final drive unit 11. The final drive unit 11 thus being carried at the front by the sub-frame 26 and at the rear by the sub-frame 24, the suspension mechanism is linked integrally with the drive unit 11, facilitating to fit the drive unit 11 to the suspension mechanism. Since, moreover, the sub-frames 24 and 26 are mounted on the chassis frame 10 through the resilient members 25 and 27, respectively, shocks and vibrations from the driving wheel 12 can be effectively isolated from the chassis frame.

FIGS. 6a and 6b illustrates modifications of the embodiment shown in FIG. 5, wherein the inner and outer leaves 17 and 18 are positioned substantially in parallel to each other. In this regard, the leaves 17 and 18 may be connected with the sub-frame 26 at a right angle thereto through pin joints 20b and 21b, respectively, in such a manner that a line IV—IV connecting the center points of the pin joints 20b and 21b deviates from the center point of the inner universal joint 22a, as illustrated in FIG. 6a. Or otherwise, the leaves 17 and 18 may be connected with the sub-frame 26 through pin joints 20c and 21c, respectively, and oriented in the fore-and-aft direction of the vehicle, viz., in a direction angled to a line V—V connecting the center points of the pin joints 20c and 21c. The inner and outer leaves 17 and 18, respectively, thus positioned, a twist in the pin joints 20c and 21c otherwise resulting from the rotation of the leaves 17 and 18 about the line V—V as the driving wheel 12 moves up or down can be eliminated, assuring a prolonged life of the pin joints. The embodiment shown in FIG. 6b is thus advantageous in that neither the inner leaf 17 nor the outer leaf 18 is subjected to a bending moment about a vertical axis even though a fore-and-aft force exerted to the driving wheel 12 acts thereupon.

Figure 7:
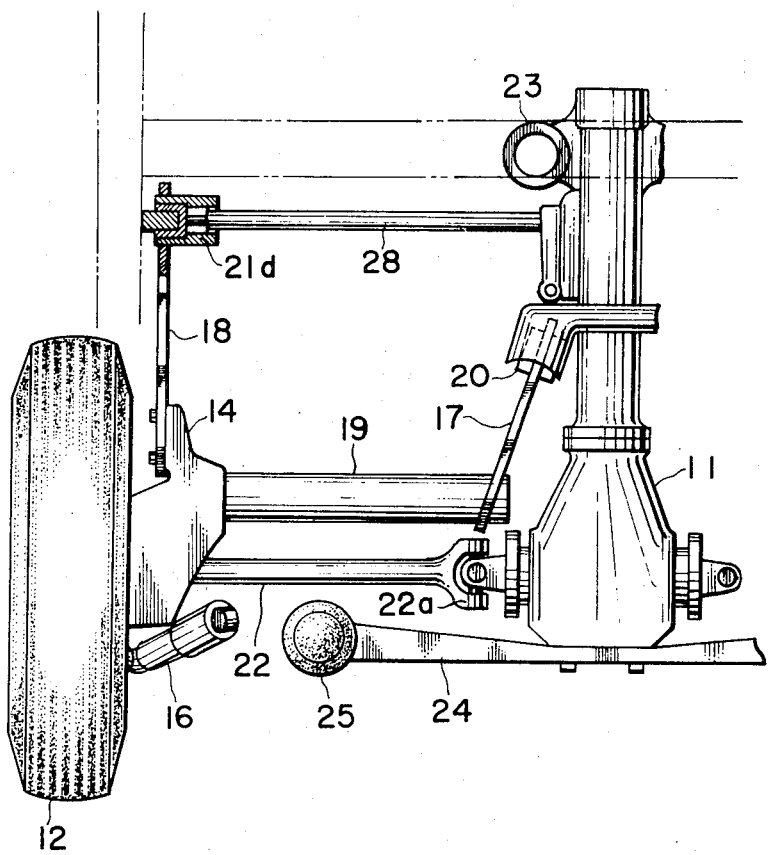
FIG. 7 is similar to FIGS. 1 and 5 but shows another modification.

If still preferred, the coil spring 15 supporting the wheel hub 14 from the chassis frame 10 may be substituted for a torsion bar spring 28, as illustrated in FIG. 7. The torsion bar spring 28 is connected at both ends with the final drive unit 11 and a pin joint 21d of the outer leaf 18. A vertical load applied to the driving wheel 12 is carried to the torsion bar spring 28 through the outer leaf 18. This embodiment will be advantageous where it is desired that the space otherwise occupied by the coil spring be utilized to accommodate other space-taking components.

It will now be apparent from the foregoing description that the rear suspension mechanism according to the invention is essentially made up of a pair of axle drive shafts and a pair of trailing arms each using only three elementary members and, as such, offers extremely simplified, light-weight construction. Since, furthermore, no sliding mechanism is involved in the axle drive shafts, the rear suspension mechanism according to the invention can assure increased reliability in performance and prolonged life of the components and parts. For all of these advantages, the rear suspension mechanism carrying out the invention is specially adapted to make available an optimum camber angle and steering axis inclination of the driving wheels as are required when the wheels move up or down with respect to the chassis frame while the vehicle is running.

What is claimed is:

1. In a motor vehicle the combination of chassis means comprising a main frame, a subframe and a final drive unit including a housing and a differential therein; a rear wheel having a spindle, drive means connecting said wheel spindle with said differential, a wheel hub rotatably mounting said spindle, a connecting member extending approximately horizontally transversely of said vehicle inwardly from said hub and having an inner end and an outer end rigidly fixed to said hub, a flat outer leaf spring extending forwardly from said hub in a direction generally fore-and-aft of the vehicle and disposed in a vertical plane, the rear end of said outer leaf spring being rigidly fixed to said hub, a flat inner leaf spring extending forwardly from the inner end of said connecting member in a direction generally fore-and-aft of the vehicle and disposed in a vertical plane, the rear end of said inner leaf spring being connected to the inner end of said connecting member, means pivotally connecting the front end of said outer leaf spring to one of said main frame and subframe of said chassis means, and means pivotally connecting the front end of said inner leaf spring to one of said subframe and final drive unit housing of said chassis means, the pivot points of said outer and inner leaf springs being disposed on a line which is inclined inwardly and rearwardly with respect to the direction of forward motion of the vehicle, and suspension spring means acting between said hub and said chassis means for spring suspending said wheel.

2. A combination according to claim 1, in which said means pivotally connecting the front ends of said outer and inner leaf springs to said chassis means comprise rubber mounts.

3. A combination according to claim 1, in which said pivotally connecting means pivotally connect the front end of said outer leaf spring to said main frame and pivotally connect the front end of said inner leaf spring to said final drive unit housing.

4. A combination according to claim 3, in which said final drive unit housing is resiliently connected with said main frame.

5. A combination according to claim 1, in which said drive means comprises a shaft with an outer universal joint connecting said shaft with said wheel spindle and an inner universal joint connecting said shaft with said differential and in which said line on which said pivot points of said leaf springs are disposed extends in front of and spaced from said inner universal joint.

6. A combination according to claim 1, in which said suspension spring means acts on said hub at a point of juncture of said hub with said connecting member, which point is disposed approximately on a line connecting the pivot point of said inner leaf spring with the center of said wheel.

7. A combination according to claim 6, in which said suspension spring means comprises a substantially vertical coil compression spring.

8. A combination according to claim 1, in which said line on which said pivot points of said inner and outer leaf springs are disposed is substantially horizontal.

9. A combination according to claim 1, in which said outer leaf spring lies in a first vertical plane parallel to the fore-and-aft axis of the vehicle and said inner leaf spring lies in a second vertical plane inclined to the fore-and-aft axis of the vehicle and diverging forwardly from said first vertical plane.

10. A combination according to claim 1, in which said pivotally connecting means pivotally connect the front ends of said leaf springs to said subframe.

11. A combination according to claim 10, in which said subframe is resiliently connected to said main frame.

12. A combination according to claim 1, in which said inner and outer leaf springs are disposed in vertical planes parallel to one another.

13. A combination according to claim 12, in which said inner and outer leaf springs extend substantially perpendicularly to said line on which said pivot points of said leaf springs are disposed.

14. A combination according to claim 12, in which said vertical planes are parallel to the fore-and-aft axis of said vehicle.

* * * * *

UNITED STATES PATENT OFFICE
CERTIFICATE OF CORRECTION

Patent No. 3,693,746     Dated September 26, 1972

Inventor(s) AKIRA YAMAMOTO

It is certified that error appears in the above-identified patent and that said Letters Patent are hereby corrected as shown below:

In the heading of the patent after "[72] Inventor:"

insert  --[73] Assignee:   Nissan Motor Company, Limited
                           Yokohama, Japan --

Signed and sealed this 1st day of May 1973.

(SEAL)
Attest:

EDWARD M. FLETCHER, JR.          ROBERT GOTTSCHALK
Attesting Officer                Commissioner of Patents